Patented Oct. 6, 1942

2,298,260

UNITED STATES PATENT OFFICE 2,298,260

METHOD OF PREPARING CELLULOSE DERIVATIVES AND PRODUCT OBTAINED THEREBY

Julius Kantorowicz, New York, N. Y., now by judicial change of name Julius Kent

No Drawing. Application July 7, 1938, Serial No. 217,921

13 Claims. (Cl. 260—212)

The present invention relates to the production of cellulose derivatives from cellulose, and particularly the cheaper grades of cellulose, such as wood and paper pulp.

It is the primary object of the present invention to provide an economical process for the manufacture of cellulose derivatives from cellulosic raw material having a relatively high proportion of cellulose, known as beta and gamma-cellulose, which is soluble in sodium hydroxide. Expressed differently, it is the primary object of the present invention to provide a more economical method for the preparation of cellulose derivatives from cellulosic material having a relatively high content of alkali-soluble components.

In a number of processes for the manufacture of cellulose derivatives, the pulp is first treated with alkali, usually sodium hydroxide, before being subjected to further chemical treatment to convert it to the desired derivative. Thus in the manufacture of viscose silk, the cellulose is first treated with a relatively strong solution of sodium hydroxide (about 17.5% by weight). The alpha-cellulose (wood and similar grades of cellulose contain about 89 or 90% of alpha-cellulose, the remainder being for the most part beta and gamma-cellulose) is insoluble in the alkali solution. The beta- and gamma-celluloses, on the other hand, are more or less readily dissolved by the alkali. When, therefore, the alkali-treated pulp is subjected to a treatment, such as pressing, for the removal of the alkali solution after the latter has acted for a pre-determined period of time, a large part, if not substantially all, of the beta- and gamma-celluloses, that is, the alkali-soluble components, are removed with the alkali solution.

This fact results in loss of economy for two reasons: In the first place, the amount of alkali cellulose is very materially reduced by the loss of the alkali-soluble components; and in the second place, the dissolved cellulose contaminates the pressed-out alkali solution to such an extent as to make it unfit for further use, the alkali thus representing practically a total loss. In accordance with the present invention, the alkali-soluble components of the cellulose are converted to the alkali-insoluble condition prior to the treatment with alkali or other agent in which they may be soluble. By this measure I effect a double increase in economy; for in addition to the fact that in, for example, a subsequent treatment with sodium hydroxide solution, the insolubilized components remain with the alpha-cellulose, the residual chemical solution acting upon the cellulose, for example, sodium hydroxide, is recovered substantially uncontaminated by dissolved cellulosic components and can be re-used upon the addition of sodium hydroxide to make up for the amount of that substance which has entered into chemical combination with the cellulose. In effect, therefore, the original soluble cellulosic components are converted into a condition in which they behave substantially like the alpha-cellulose, so that my process may be considered as including the preliminary step of converting wood and other relatively low grade cellulose into alpha-pulp, which is the term given in the industry for high grade cellulose stock having about 99% or more of alpha-cellulose.

I have found that a more economical and efficient process for the manufacture of cellulose derivatives can be obtained by converting the alkali-soluble components of cellulose into an alkali-insoluble condition resembling that of alpha-cellulose by preliminary treatment of the cellulose with formaldehyde. This preliminary treatment, I have found, in effect converts a lower grade cellulose into an alpha-pulp substantially without any loss of cellulose material. Whereas heretofore the raising of the alpha-cellulose content of a pulp has been accomplished only by the removal of the alkali-soluble components, the present invention makes it possible to convert a cellulose having less than 99% alpha-cellulose into an approximately equal weight of cellulose which behaves toward alkali and toward esterifying, etherifying and other chemical agents like a 99% (or higher) alpha-cellulose.

The pre-treated cellulose prepared in accordance with the present invention can be subjected to the action of alkali solutions of standard concentrations (17.5 or 18% by weight) and also higher or lower concentrations with practically no loss of cellulose. The alkali cellulose can then be subjected to the action of carbon bisulfide, or of acetic acid and other acids and other reagents in the known processes for converting cellulose into viscose, acetate, nitro-cellulose and other artificial silks and into the various known cellulosic derivatives used in the manufacture of pyroxylins, lacquers, Celluloid and other plastics, etc.

In carrying out the preliminary treatment in accordance with the present invention, the cellulose is subjected to the action of formaldehyde in the presence of an acid or of an acid-reacting substance for a short period of time, part of the treatment being conducted at relatively high temperatures, as described in my co-pending application, Serial No. 187,965, filed January 31, 1938. Thus, to a mixture of the following composition:

| | Kg. |
|---|---|
| 40% formaldehyde | 100 |
| Concentrated nitric acid | ½ |
| Water | 50 | there is added enough cellulose, preferably in the shredded or comminuted condition, to make a more or less heavy suspension. The mixture is agitated for several seconds at room temperature or at temperatures up to about 50° C., for example 3 or 4 seconds at 50° C., after which the cellulosic material is removed from the liquid, as by pressing, centrifuging, etc. The still moist cellulose is now subjected to a temperature of about 120° C., at which temperature the beta- and gamma-cellulose insolubilizing reaction takes place quite rapidly. Somewhat higher temperature can, of course, be employed for shorter periods of time provided that the temperatures are not so high as to injure the cellulose material. The treatment at 120° C. may take place for a sufficient length of time to cause drying of the cellulose, proper facilities being provided for carrying off the vapors. By this treatment the original cellular structure of the cellulose is modified and the cellulose is rendered extremely brittle. The treatment may, however, be somewhat less drastic, the cellulose being rendered only partially brittle, provided that it has been subjected to the action of the aldehyde and acid sufficiently to convert the original alkali-soluble components to the alkali-insoluble condition.

The drying of the cellulose can occur simultaneously with the treatment at elevated temperatures, such treatment being preferably above 100° C., a temperature of the order of 120° C. being quite satisfactory. If desired, however, the mixture of cellulose and formaldehyde and acid solution may be heated under pressure in a closed vessel or autoclave, the drying being effected subsequently at a lower temperature with or without the aid of vacuum. If desired, the drying can be omitted altogether, in which case the cellulose, after pressing out of excess solution, is preferably washed with water until substantially free from formaldehyde and acid.

The formaldehyde-treated cellulose can now be subjected to any known treatment for the conversion thereof to its derivatives; it can, in fact, be subjected to any chemical treatment to which the ordinary cellulose or alpha-pulp has heretofore been subjected for the preparation of various kinds of artificial silks, lacquers, plastics, explosives, etc. Thus in the preparation of viscose silk, the dried cellulose can be subjected, in known manner, to the action of a sodium hydroxide solution of 17.5 strength by weight, and the excess alkali solution then pressed out. This excess solution can be re-used, as explained hereinabove. The flaked alkali-cellulose may then be aged if desired, and thereafter treated with carbon bisulfide to produce cellulose xanthate. The xanthate is then worked up in known manner to produce filaments, films, etc.

I am unable to explain the action of the formaldehyde on the normally alkali-soluble cellulose components but it is quite possible, although I do not wish to be understood as being committed to this theory, that the beta- and gamma-celluloses, which are believed to contain a shorter carbon chain than alpha-cellulose, add on formaldehyde in some fashion and thereby attain or approach the longer carbon chain of alpha-cellulose. It is also possible that the acid acts as a catalyst inducing the polymerization of the formaldehyde within the cellulose, the polymer then forming some chemical association with the cellulose. Whatever the actual chemical reaction, I have found it to be the fact that the insolubilized cellulose components act identically with alpha-cellulose, for example. There is no turbidity in cellulose acetate and other films prepared from cellulose which has been modified in accordance with the invention, whereas similar films prepared from lower grade cellulose stock show various degrees of turbidity. The formaldehyde can be replaced in my process by its polymers or other formaldehyde-releasing bodies, while the acid material may be either inorganic or organic in nature, and acid salts may also be employed, for example, sulfuric acid, oxalic acid, soluble bisulfates, etc., it being, however, desirable to avoid acids having a hydrolyzing action on the cellulose under the conditions of the reaction, that is, acting to convert the cellulose into sugar or sugar-like materials. Any kind of cellulose having a substantial portion of alkali-soluble components may be used, such as wood, ramie, bagasse, etc.

While the cellulose pretreated as above described is particularly suitable for use in processes involving treatment of the cellulose with alkali, it can, of course, be used in processes which do not include treatment with alkali. The term "alkali-insoluble" or the like, as used in this specification and in the claims, is therefore to be understood merely as being descriptive of a property of the cellulose and not as necessarily indicating the use of the cellulose in an alkali-treatment process. Thus the treatment above described makes the beta and gamma celluloses insoluble also in acids, so that the advantages of my process appear also in the after-treatment of the formaldehyde-cellulose with acids.

Variations in the proportions and conditions of reactions set forth hereinabove may, of course, be resorted to within the scope of the appended claims without departing from the principles of the invention.

I claim:

1. In a process for the manufacture of cellulosic derivatives from cellulosic material containing a substantial proportion of alkali-soluble components, the steps which comprise subjecting the cellulose to the action of formaldehyde under heat and in the presence of a small proportion of a catalyst until the alkali-soluble components are converted to the alkali-insoluble condition, and thereafter reacting the cellulose with a reagent capable of converting the cellulose into the corresponding derivative.

2. In a process for the manufacture of cellulosic derivatives from cellulosic material containing a substantial proportion of alkali-soluble components, the steps which comprise subjecting the cellulose to the action of formaldehyde and a small proportion of nitric acid under heat until the alkali-soluble components are converted to the alkali-insoluble condition, and thereafter reacting the cellulose with a reagent capable of converting the cellulose into the corresponding derivative.

3. In a process for the manufacture of cellulosic derivatives from cellulosic material containing a substantial proportion of alkali-soluble components, the steps which comprise subjecting the cellulose to the action of formaldehyde in the presence of a small proportion of a mineral acid at elevated temperature until the alkali-soluble components are converted to the alkali-insoluble condition, and thereafter reacting the cellulose with a reagent capable of converting the cellulose into the corresponding derivative.

4. In a process for the manufacture of cellulosic derivatives from cellulosic material containing a substantial proportion of alkali-soluble components, the steps which comprise subjecting the cellulose to the action of formaldehyde and a small proportion of nitric acid at elevated temperature until the alkali-soluble components are converted to the alkali-insoluble condition, and thereafter reacting the cellulose with a reagent capable of converting the cellulose into the corresponding derivative.

5. A process for the manufacture of cellulosic derivatives which comprises treating a cellulose containing a substantial proportion of alkali-soluble components with formaldehyde in the presence of a small proportion of a mineral acid at elevated temperatures, treating the cellulose with an alkali, removing excess reagents, and subsequently reacting the alkali-cellulose with an organic reagent to convert the cellulose into its corresponding organic derivative.

6. A process for the manufacture of cellulosic derivatives which comprises reacting a cellulose which has been treated with formaldehyde at a temperature of about 120° C. in the presence of a small proportion of catalyst, with an alkali, and subsequently subjecting the alkali-cellulose to the action of an organic reagent to convert the cellulose into its corresponding organic derivative.

7. A cellulosic product comprising an organic ester derivative of a cellulose originally containing a substantial proportion of beta and gamma cellulose and modified by treatment with formaldehyde and a small proportion of acid catalyst and heating to about 120° C., said product containing the ester derivative also of the major portion of said beta and gamma cellulose.

8. In a process for the manufacture of cellulose esters, the steps which comprise treating cellulose with formaldehyde in the presence of a small proportion of an acid material at an elevated temperature, and subsequently treating the product with an esterifying agent.

9. A process for the manufacture of soluble cellulosic derivatives, which comprises subjecting cellulosic material to the action of formaldehyde in the presence of a small proportion of an acidic catalyst, heating the cellulose to about 120° C. and then reacting the so pre-treated cellulose with an agent capable of converting the same into a soluble derivative.

10. The cellulose ester reaction product of an esterifying agent and a formaldehyde-modified cellulose.

11. The cellulosic reaction product of an organic reagent capable of reacting with cellulose to produce the corresponding cellulose derivative, and an alkali-reacted, formaldehyde modified cellulose.

12. The cellulosic reaction product of an organic reagent capable of reacting with cellulose to produce the corresponding cellulose derivative, and a cellulose which has been modified by heating with formaldehyde and a relatively small proportion of nitric acid.

13. A process for the manufacture of cellulosic derivatives which comprises moistening cellulose containing a substantial proportion of alkali-soluble components with aqueous formaldehyde and a small proportion of a catalyst, heating the so-treated cellulose at about 120° C. until such components are converted to the alkali-insoluble condition, and then treating the cellulose with an esterifying agent to convert the cellulose into its corresponding ester.

JULIUS KANTOROWICZ.